United States Patent [19]
Narahara

[11] Patent Number: 5,505,242
[45] Date of Patent: Apr. 9, 1996

[54] PNEUMATIC RADIAL TIRE WITH RESISTANCE TO SIDEWALL BRUISING

[75] Inventor: Yasuhiro Narahara, Brussels, Belgium

[73] Assignee: Sumitomo Rubber Industries, Ltd., Hyogo, Japan

[21] Appl. No.: 347,096

[22] Filed: Nov. 23, 1994

[30] Foreign Application Priority Data

Dec. 28, 1993 [JP] Japan .................. 5-349249

[51] Int. Cl.⁶ .................. B60C 3/00; B60C 9/00; B60C 9/18; B60C 13/00
[52] U.S. Cl. .................. 152/454; 152/525; 152/538; 152/555
[58] Field of Search .................. 152/454, 525, 152/538, 555

[56] References Cited

U.S. PATENT DOCUMENTS

| | | | |
|---|---|---|---|
| 3,450,182 | 6/1969 | Verdier | 152/538 X |
| 4,266,995 | 5/1981 | Kitazawa et al. | 152/525 X |
| 4,328,850 | 5/1982 | Uemura | 152/454 X |
| 4,387,758 | 6/1983 | Matsuda et al. | 152/454 |
| 4,408,648 | 10/1983 | Ohashi | 152/454 |
| 4,442,879 | 4/1984 | Uemura | 152/454 X |
| 4,856,572 | 8/1989 | Casanova et al. | 152/454 |
| 5,117,886 | 6/1992 | Tokutake | 152/454 |
| 5,277,236 | 6/1994 | Takatsu et al. | 152/454 X |

*Primary Examiner*—Adrienne C. Johnstone
*Attorney, Agent, or Firm*—Birch, Stewart, Kolasch & Birch

[57] ABSTRACT

A pneumatic radial tire comprising an annular tread, a pair of sidewalls, an annular bead, a carcass, and an annular belt, when mounted on a standard rim to specifications and inflated with a standard pressure, staisfies the following condition:

$\theta 1 \leq 30$ degrees and $\theta 2 \leq 30$ degrees, wherein $\theta 1$ and $\theta 2$ are the acute angles formed by lines P1 and P2, respectively, with respect to an imaginary straight line D which extends radially from the axial outer end point (62) of a rim flange (61) in a plane containing the rotating axis of the tire, the lines P1 and P2 being tangential to the outer surface profile (22) of either sidewall at points E1 and E2 where the outer surface profile (22) intersects with the straight line D.

2 Claims, 3 Drawing Sheets

S: THE DISTANCE BETWEEN THE CURB AND THE AXIAL OUTER END POINT OF THE RIM FLANGE.

PNEUMATIC RADIAL TIRE WITH RESISTANCE TO SIDEWALL BRUISING

BACKGROUND OF THE INVENTION

1. Field of the Invention

The present invention relates to a pneumatic radial tire that has the sidewall thickness reduced in order to achieve tire weight reduction.

2. Description of Prior Art

One of the major objectives in the current tire technology is to reduce the tire weight and, hence, fuel consumption. To this end, various proposals have been made and one of them is to reduce the rubber thickness of the sidewalls.

A common practice adopted by conventional tires to make them lighter and increase fuel efficiency is to reduce the rubber thickness of sidewalls to values between 2.0 and 3.0 mm.

A mechanism by which the sidewalls of a tire are damaged is illustrated in FIGS. 5 to 7. Suppose that a tire A mounted on a rim B is rotating along a curb D (usually 170 mm high) in such a way that the outer lateral edge of a rim flange C nearly touches the curb D. Since a sidewall A1 of the tire A protrudes outward of the outer lateral edge of the rim flange C, the sidewall A1 is forced between the end edge of the curb D and the outer lateral edge of the rim flange C (see FIG. 7), occasionally causing damage to the outer lateral surface of the rubber layer in the sidewall A1.

However, with the above-described structure of conventional tires, in which the rubber thickness from the outer lateral surface of each sidewall to the carcass layer is somewhere between 2.0 and 3.0 mm, there is little likelihood that a bruise in the rubber layer in sidewall A1 will propagate to the carcass embedded in that sidewall.

Problems to be Solved by the Invention

If, however, the thickness of the rubber layer in sidewall A1 of the conventional tire design is reduced to less than 2.0 mm with a view to achieving a further reduction in tire weight, a bruise that develops in the rubber layer in sidewall A1 in a case like the one described above will soon propagate to the carcass, causing the carcass cords to break and the tire to blow out. Thus, the bruise resistance of the tire is impaired.

SUMMARY OF THE INVENTION

An object, therefore, of the present invention is to provide a pneumatic radial tire that has the thickness of the rubber layer in the sidewalls reduced and yet is improved in bruise resistance, thereby satisfying the requirements for a lighter tire weight and a higher fuel efficiency.

To attain this object, the present invention provides a pneumatic radial tire comprising an annular tread, a pair of sidewalls extending radially from both ends of the tread, an annular bead provided in the end portion of each sidewall, a carcass extending from both sides of the tread portion through the sidewalls to the beads, and an annular belt provided radially outward of the carcass, wherein the tire, when mounted on a standard rim to specifications and inflated with a standard pressure, satisfies the following condition:

$\theta_1, \theta_2 \leq 30$ degrees wherein $\theta_1$ and $\theta_2$ are the acute angles formed by lines P1 and P2, respectively, with respect to an imaginary straight line D which extends radially from the axial outer end point of a rim flange in a plane containing the rotating axis of the tire, the lines P1 and P2 being tangential to the outer surface profile of either sidewall at points E1 and E2 where the outer surface profile intersects with the straight line D.

Because of this structure, neither sidewall of the tire will be forced between the curb and the outer end of the rim flange, even if it is rotating along the curb such a way that the outer end of the rim flange nearly touches the curb. Hence, the sidewalls of the tire of the invention can be effectively reduced in thickness while improving its bruise resistance.

Furthermore, the width of the annular belt embedded in the tread is made greater than a value that is equal to the width of the standard rim to specifications minus ½ inch. This offers an advantage in the case where the tire is mounted on a rim of a smaller width than the standard rim to specifications (a rim to specifications is available that is ½ inch or 1 inch smaller in width than the standard rim to specifications). That is, even if the tire is rotating along a curb in such a way that the outer end of the rim flange nearly touches the curb, neither sidewall will be forced between the curb and the outer end of the rim flange and this contributes a satisfactory level of bruise resistance to the tire.

The "standard rim to specifications" as mentioned hereinabove refers to the "measuring rim" which is specified in the Year Book published by The Tire and Rim Association Inc., or the "standard rim" which is specified in JATMA Year Book published by The Japan Automobile Tire Manufacture's Association, Inc.

Still further, the thickness of the sidewall rubber layer, which forms each sidewall and is radially outward of the carcass or at least one other layer of reinforcement provided radially outward thereof, is adjusted to no more than 1.6 mm. This contributes to a reduction in the thickness of the rubber layer in the sidewalls, thereby satisfying the requirements for lighter tire weight and smaller fuel consumption.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Embodiments of the present invention will be described below with reference to the accompanying drawings.

Figure 1:
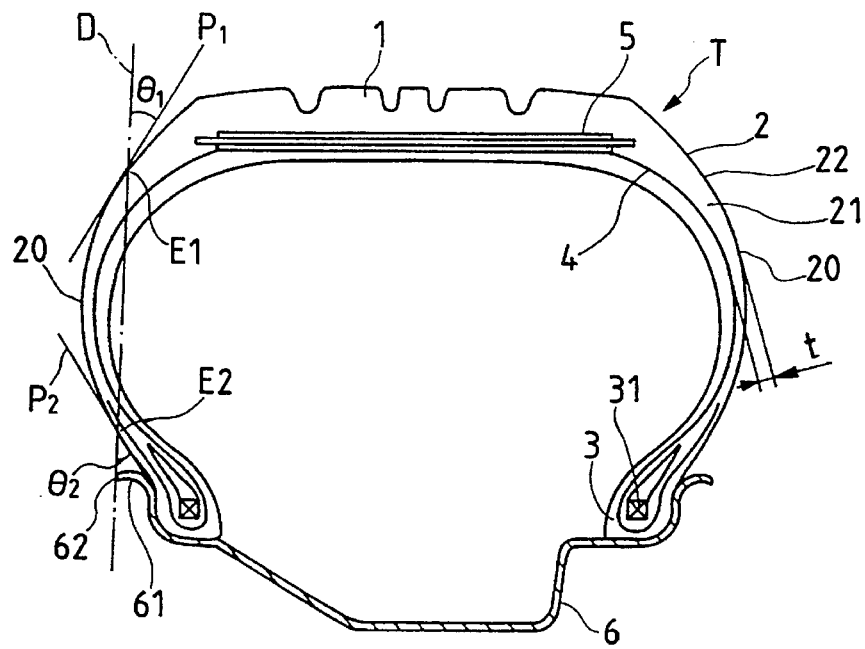
FIG. 1 is a cross section of a pneumatic radial tire according to the first embodiment of the present invention.

FIG. 1 is a cross section of a pneumatic radial tire T according to a first embodiment of the present invention. The tire T comprises an annular tread 1, a pair of sidewalls 2 extending radially inward from both ends of the tread 1, an annular bead 3 provided in the inner end of each sidewall 2, a carcass 4 extending through the tread 1 and sidewalls 2 so that both ends are turned up around bead cores 31 embedded in the bead 3, and an annular belt 5 placed under the tread 1 radially outward of the carcass 4. The tire T having this structure is mounted on a standard rim to specifications 6 and inflated with a standard pressure.

In the first embodiment, the thickness t of a sidewall rubber layer 21 which is placed radially outward of the carcass 4 is adjusted to no more than 1.6 mm (t≦1.6 mm). In addition, the tire is designed to satisfy the condition: θ1≦30 degrees and θ2≦30 degrees where θ1 and θ2 are the acute angles formed by lines P1 and P2, respectively, with respect to an imaginary straight line D which extends radially from the axial outer end point 62 of a rim flange 61 in a plane containing the rotating axis of the tire. The lines P1 and P2 are tangential to the outer surface profile 22 of either sidewall 2 at points E1 and E2 where the outer surface profile 22 intersects with the straight line D.

According to this tire construction in which each of the acute angles θ, which the tangential lines P1 and P2 passing through points E1 and E2 where the outer profile 22 of either sidewall 2 intersects with the straight line D from the flange end will form with respect to the straight line D, is adjusted to no more than 30 degrees. Thus, the amount by which the widest part of the tire 20 protrudes outward of the straight line D, or the outer end position of the rim flange 61 is sufficiently reduced. Therefore, neither sidewall 2 of the tire will be forced between the curb and the outer end of the rim flange 61 even if the tire is rotating along the curb in such a way that the outer end of the rim flange 61 nearly touches the curb. As a result, the sidewalls 2 of the tire can be effectively reduced in thickness while improving its bruise resistance.

The tire T is so adapted that the thickness t of the sidewall rubber layer 21 which is placed radially outward of the carcass 4 is no more than 1.6 mm and this helps satisfy the requirements for lighter tire weight and smaller fuel consumption.

In a certain type of tire, not only the carcass 4 but also at least one other layer of reinforcement is placed in sidewalls 2; in this case, the thickness t of the sidewall rubber layer which is placed radially outward of that at least one additional layer of reinforcement should be adjusted to no more than 1.6 mm.

Figure 2:
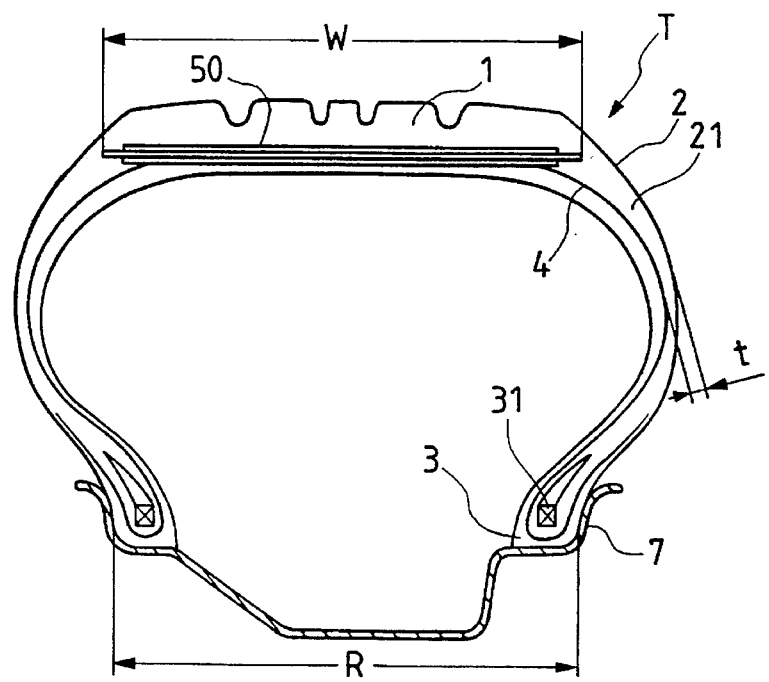
FIG. 2 is a cross section of a pneumatic radial tire according to the second embodiment of the present invention.

FIG. 2 is a cross section of a pneumatic radial tire T according to a second embodiment of the present invention, in which the width W of a belt 50 embedded in the tread 1 is adjusted to be greater than the width R of a rim to specifications that is ½ inch narrower than the standard rim to specifications.

If an inflated tire is mounted on a rim to specifications that is narrower, say, ½ inch narrower, than the width of the standard rim to specifications, the axial distance between the widest part of the tire 20 and the straight line D from the flange end increases so much that when the tire is rotating along a curb in such a way that the outer end of the rim flange nearly touches the curb, the chance that either sidewall 2 is forced between the curb and the outer end of the rim flange will increase, thereby making the tire more susceptible to damage. In contrast, the width W of the belt 50 in the tire according to the second embodiment of the invention is adjusted to be greater than the rim width R. With this construction, the sidewalls 2 will first contact the curb in areas that are near the end portion of the tread 1. Since this portion of the tread 1 is difficult to deform on account of the rigidity of the belt 50, the deformation of the sidewalls 2 is effectively suppressed to eliminate the chance of their being forced between the curb and the outer end of the rim flange. With the bruise resistance of the tire being thus maintained at a satisfactory level, one can reduce the thickness of the sidewalls 2 by a sufficient amount to achieve higher fuel efficiency. Another available rim to specifications is such that the width is one inch smaller than the width of the standard rim to specifications and the bruise resistance of a tire that is mounted on this rim can also be maintained at a satisfactory level for the same reason as mentioned above in connection with the case of mounting on a rim ½ inch narrower than the standard rim.

Furthermore, the thickness t of the sidewall rubber layer 21 which is placed radially outward of the carcass 4 may be no more than 1.6 mm and this again helps satisfy the requirements for lighter tire weight and smaller fuel consumption.

A test was conducted with pneumatic radial tire samples embodying the invention, as well as comparative samples. Tire size: 185/65R14; Rim size: $14 \times 5^{1/2}$ JJ θ1: the acute angle which tangential line P1 in the upper half of the tire forms with an imaginary straight line D which extends radially from the axial outer end point of the rim flange;

θ2: the acute angle which tangential line P2 in the lower half of the tire forms with the straight line D;

t: the thickness of the rubber layer in each sidewall; Invention tire 1a: t=1.6 mm; θ1=θ2=28 degrees; Invention tire 1b: t=1.6 mm; θ1=θ2=30 degrees;

Comparative tire 1: t=1.6 mm; θ1=33 degrees; θ2=31 degrees;

Comparative tire 2: t=3.0 mm; θ1=33 degrees; θ2=31 degrees.

Comparative tire 2 had the structure of a conventional tire.

Figure 3:
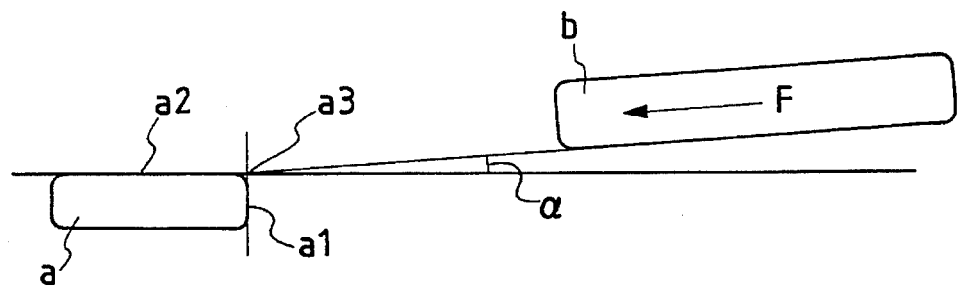
FIG. 3 is a sketch showing how tire samples are tested for bruise resistance.

Test method (see FIG. 3)

Curb a was an iron rectangular prism that was 170 mm high and all corners of which to be contacted by tire b were made round with the radius of curvature set at 0.5 mm. The tire b approaching the curb a would contact it at an angle (α) of 2 degrees. The rotating tire b as it was moving in the direction of arrow F at a speed of 60 cm/min was rubbed against the curb a and the profile of damage to the tire was investigated as a function of distance s between curb a and the axial outer end point of the rim flange (point 62 in FIG. 1) (stated more precisely, s was the shortest distance between the axial outer end point and the straight line a3 formed by the intersection of imaginary planes that were extensions of the front side a1 and the rubbing face a2 of the curb a when the axial outer end point 62 reached an imaginary plane that was an extension of the front side face a1 toward the tire).

The test was complete (the tire rotation was stopped) when the rim flange contacted the curb or when the most advancing part of the axial outer end point of the rim flange passed by the curb.

Figure 4:
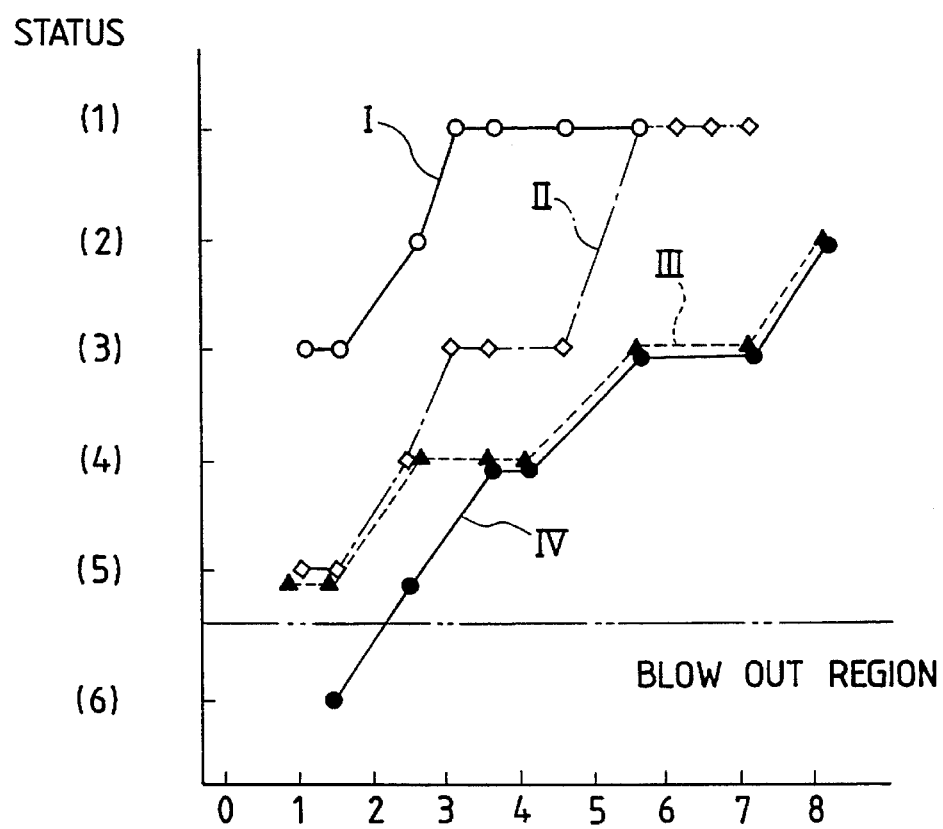
FIG. 4 is a graph showing the results of the test conducted on four tire samples.
Figure 5:
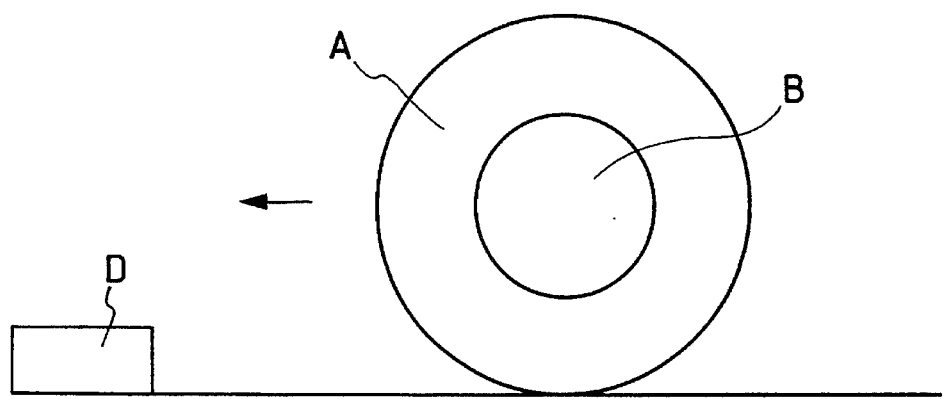
FIG. 5 is a side view showing a tire approaching a curb.
Figure 6:
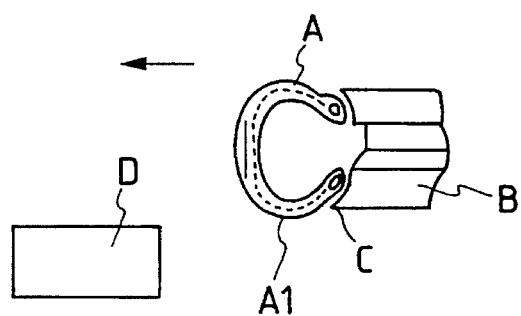
FIG. 6 is a cross section view showing the tire approaching the curb.
Figure 7:
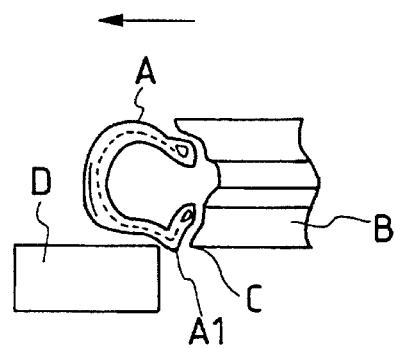
FIG. 7 is a cross section view showing how the tire is damaged by rubbing against the curb.

FIG. 4 shows the results of the test conducted in the manner described above; kinked line I refers to invention tire 1a, kinked line II to invention tire 1b, kinked line III to comparative tire 1, and kinked line IV to comparative tire 2. Reference numerals of the status in FIG. 4 designate the following: (1) The curb only rubs the sidewall of the tire; (2) The sidewall is forced between the curb and the rim flange, and then escaping, so that the sidewall does not receive external damages; (3) The sidewall receives stripe-shaped grazes on its widest portion; (4) The sidewall is rubbed off and has slight defects which are not deep enough to reach the carcass; (5) The sidewall is bored large holes which reach to the carcass but the holes are not deep enough to break the carcass, so that the air does not leak; and (6) The sidewall is bored large holes which are deep enough to break the sidewall carcass and to leak air, that is, the tire blows out. As one can see from FIG. 4, invention tires 1*a* and 1*b* in which both $\theta 1$ and $\theta 2$ (the acute angles tangential lines P1 and P2 in the upper and lower halves of the tire formed with the radially extending straight line D) were 30 degrees or smaller were characterized by less susceptibility to damage of the sidewalls than comparative tires 1 and 2 in which $\theta 1$ and $\theta 2$ exceeded 30 degrees; as a result, the thickness t of the rubber layer in the sidewalls could be reduced by a satisfactory amount.

Comparing the results of invention tires 1*a* and 1*b*, one can see that although $\theta 1$ and $\theta 2$ were no more than 30 degrees in both samples, tire 1*a* having the smaller value was less vulnerable to damage.

Advantages of the Invention

Being constructed in the manner described hereinabove, the pneumatic radial tire of the present invention offers the following advantages.

When mounted on a standard rim to specifications and inflated with a standard pressure, the tire satisfies the condition: $\theta 1, \theta 2 \leq 30$ degrees, where $\theta 1$ and $\theta 2$ are the acute angles formed by lines P1 and P2, respectively, with respect to an imaginary straight line D which extends radially from the axial outer end point of the rim flange in a plane containing the rotating axis of the tire, the lines P1 and P2 being tangential to the outer surface profile of either sidewall at points E1 and E2 where the outer surface profile intersects with the straight line D. Because of this structure, neither sidewall of the tire will be forced between a curb and the outer end of the rim flange even if it is rotating along the curb in such a way that the outer end of the rim flange nearly touches the curb. Hence, the sidewalls of the tire of the invention can be effectively reduced in thickness while improving its bruise resistance.

If desired, the width of the annular belt embedded in the tread may be rendered greater than a value that is equal to the width of the standard rim to specifications minus ½ inch.

This offers an advantage in the case where the tire is mounted on a rim of a smaller width than the standard rim to specifications; that is, even if the tire is rotating along a curb in such a way that the outer end of the rim flange nearly touches the curb, neither sidewall will be forced between the curb and the outer end of the rim flange and this contributes a satisfactory level of bruise resistance to the tire.

Furthermore, the thickness of the sidewall rubber layer forming each sidewall radially outward of the carcass or at least one other layer of reinforcement provided radially outward thereof may be adjusted to no more than 1.6 mm. This contributes to a reduction in the thickness of the rubber layer in the sidewalls, thereby satisfying the requirements for lighter tire weight and smaller fuel consumption.

What is claimed is:

1. A pneumatic radial tire comprising an annular tread, a pair of sidewalls extending radially from both ends of the tread, an annular bead provided in the end portion of each sidewall, a carcass extending from both sides of the tread through the sidewalls to the beads, optionally at least one other layer of reinforcement radially outward of the carcass in each sidewall and an annular belt provided radially outward of the carcass and embedded in the tread, wherein the thickness of a sidewall rubber layer, which forms each sidewall and is radially outward of either the at least one other layer of reinforcement or the carcass when the at least one other layer of reinforcement is not present, is no more than 1.6 mm, said tire, when mounted on a standard rim to specifications and inflated with a standard pressure, satisfying the following condition:

$\theta 1 \leq 30$ degrees; and $\theta 2 \leq 30$ degrees, wherein $\theta 1$ and $\theta 2$ are the acute angles formed by lines P1 and P2, respectively, with respect to an imaginary straight line D which extends radially from the axial outer end point (62) of a flange of the rim in a plane containing the rotating axis of the tire, said lines P1 and P2 being tangential to the outer surface profile of either sidewall at points E1 and E2 where said outer surface profile intersects with said straight line D.

2. The pneumatic radial tire according to claim 1 wherein when the tire is mounted on the standard rim to specifications and inflated with the standard pressure the width of the annular belt embedded in the tread is greater than a value that is equal to the width of the standard rim to specifications minus ½ inch.

\* \* \* \* \*